(12) United States Patent
Ma

(10) Patent No.: US 9,909,791 B2
(45) Date of Patent: Mar. 6, 2018

(54) COMBINED VAPOR ABSORPTION AND MECHANICAL COMPRESSION CYCLE DESIGN

(71) Applicant: Carrier Corporation, Farmington, CT (US)

(72) Inventor: Zidu Ma, Ellington, CT (US)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 14/783,638

(22) PCT Filed: Apr. 1, 2014

(86) PCT No.: PCT/US2014/032501
§ 371 (c)(1),
(2) Date: Oct. 9, 2015

(87) PCT Pub. No.: WO2014/168785
PCT Pub. Date: Oct. 16, 2014

(65) Prior Publication Data
US 2016/0320106 A1 Nov. 3, 2016

Related U.S. Application Data

(60) Provisional application No. 61/810,865, filed on Apr. 11, 2013.

(51) Int. Cl.
*F25B 25/02* (2006.01)
(52) U.S. Cl.
CPC .................... *F25B 25/02* (2013.01)
(58) Field of Classification Search
CPC .......... F25B 25/02; F25B 15/02; F25B 27/02; F25B 30/00; F25B 30/02; F25B 30/04;
(Continued)

(56) References Cited

U.S. PATENT DOCUMENTS 4,031,712 A * 6/1977 Costello .................. F25B 15/00
62/483
4,100,755 A * 7/1978 Leonard .................. F25B 15/06
62/104
(Continued)

FOREIGN PATENT DOCUMENTS

DE 102008013585 A1 9/2009
EP 0138041 A2 4/1985
(Continued)

OTHER PUBLICATIONS

Hong. Daliang, et al., A Novel Absorption Refrigeration Cycle; Applied Thermal Engineering; 2010; vol. 30; pp. 2045-2050.
(Continued)

*Primary Examiner* — Mohammad M Ali
(74) *Attorney, Agent, or Firm* — Cantor Colburn LLP

(57) ABSTRACT

A refrigeration system is provided including a vapor compression cycle (20) having a condenser (22), and expansion valve (24), and evaporator (26) and a compressor (28). A refrigerant is configured to circulate through the vapor compression cycle. The refrigeration system also includes an absorption refrigeration cycle (30) having an absorber (32) and a desorbed (34) arranged in a generally closed loop configuration. An absorption solution is configured to circulate through the absorption refrigeration cycle. The vapor compression cycle and the absorption refrigeration cycle are substantially integrated. The absorber is fluidly coupled to the compressor and is configured to generate a mixture of refrigerant and absorption solution. The desorber is fluidly coupled to the condenser and is configured to separate the refrigerant from the mixture and increase a pressure of the refrigerant vapor.

16 Claims, 5 Drawing Sheets

(58) Field of Classification Search
CPC . F25B 15/16; F24F 3/14; F24F 3/1417; F24F 3/1429; F24F 3/147; F24F 11/0008; Y02B 30/62
USPC .................................................. 62/101, 476
See application file for complete search history.

(56) References Cited

U.S. PATENT DOCUMENTS

| | | | | |
|---|---|---|---|---|
| 4,171,619 | A * | 10/1979 | Clark | F25B 27/007 62/101 |
| 4,285,208 | A * | 8/1981 | Takeshita | F25B 25/02 62/141 |
| 5,038,574 | A * | 8/1991 | Osborne | F25B 15/06 62/101 |
| 5,212,961 | A | 5/1993 | Graf | |
| 5,285,645 | A * | 2/1994 | Yamada | F24F 3/06 62/333 |
| 5,582,020 | A * | 12/1996 | Scaringe | C09K 5/041 418/76 |
| 5,617,738 | A * | 4/1997 | Ikegami | F25B 11/02 62/509 |
| 5,921,092 | A * | 7/1999 | Behr | A47F 3/0482 62/155 |
| 5,934,101 | A | 8/1999 | Takaki et al. | |
| 5,987,902 | A * | 11/1999 | Scaringe | C09K 5/041 62/112 |
| 6,324,865 | B1 | 12/2001 | Lee et al. | |
| 7,765,823 | B2 * | 8/2010 | Shiflett | C09K 5/047 252/67 |
| 8,286,431 | B2 | 10/2012 | Briesch et al. | |
| 8,707,720 | B2 * | 4/2014 | Shiflett | C09K 5/047 252/67 |
| 2004/0093876 | A1 * | 5/2004 | Inagaki | B01J 20/0292 62/112 |
| 2005/0247336 | A1 * | 11/2005 | Inaoka | B60H 1/004 136/205 |
| 2006/0107674 | A1 * | 5/2006 | Sharma | F25B 15/008 62/238.3 |
| 2007/0019708 | A1 * | 1/2007 | Shiflett | F25B 25/02 374/181 |
| 2007/0295478 | A1 | 12/2007 | Shiflett et al. | |
| 2010/0257879 | A1 * | 10/2010 | Shiflett | C09K 5/047 62/112 |
| 2011/0132027 | A1 * | 6/2011 | Gommed | F24F 3/1417 62/477 |
| 2011/0167864 | A1 * | 7/2011 | Gu | F25B 15/04 62/476 |
| 2012/0266618 | A1 * | 10/2012 | Levy | F24F 3/1417 62/101 |

FOREIGN PATENT DOCUMENTS

| | | |
|---|---|---|
| EP | 2447483 A2 | 5/2012 |
| EP | 2508721 A2 | 10/2012 |
| WO | 2011027350 A2 | 3/2011 |
| WO | 2013006957 A1 | 1/2013 |

OTHER PUBLICATIONS

Notification of Transmittal of the International Search Report for International Application No. PCT/US2014/032501 dated Jun. 18, 2014; Mailed Sep. 9, 2014; 8 pages.

Written Opinion of the International Searching Authority for International Application No. PCT/US2014/032501 dated Jun. 18, 2014; Mailed Sep. 9, 2014; 8 pages.

Chinese Office Action and Search with English Translation; Report for Appln. No. 201480020346.6; Filing Date: Arp. 1, 2014; Dated: Jul. 4, 2017; pp. 1-9.

IPRP; International Application No. PCT/US2014/032501; International Filing Date: Apr. 1, 2014; Dated: Oct. 13, 2015, pp. 1-9.

K. Meng, et al., "Energy Saving Mechanism Analysis of the Absorption—Compression Hybrid refrigeration cycle," Renewable Energy, 57, 2013, pp. 1-15.

M. Jelinek, et al., "The performance of a triple pressure level absorption cycle (TPLAC) with working fluids based on the absorbent DMEU and the refrigerants R22, R32, R124, R125, R134a and R152a," Applied Thermal Enginering 28, 2008, pp. 1551-1555.

R. Radermacher, et al., "Combined Vapor Compression/Absorption Heat Pump Cycles for Engine-Driven Heat Pumps," Final Report Maryland Univ. Dec. 1988, pp. 1-2, Abstract Only.

R.K. Al-Dadah, et al., "Solar Powered Vapor Absorption System using Propane and Alkylated Benzene AB300 oil," Applied Thermal Engineering 31, 2011, pp. 1936-1942.

Z. J. Chen, et al., "Optimization Study of Absorption-Compression Cooling Cycles," International Refrigeration and Air Conditioning Conference, 1992, pp. 1-7.

* cited by examiner

US 9,909,791 B2

COMBINED VAPOR ABSORPTION AND MECHANICAL COMPRESSION CYCLE DESIGN

BACKGROUND OF THE INVENTION

Exemplary embodiments of the invention relate generally to a heating, ventilation, air conditioning and refrigeration (HVAC&R) system, and more particularly to HVAC&R system including an integrated vapor compression cycle and absorption refrigeration cycle.

Both absorption refrigerators and mechanical vapor compression (or vapor compression) refrigerators generally use a refrigerant with a very low boiling point. In both refrigerators, when this refrigerant evaporates or boils, it takes some heat away with it, providing a cooling effect. However, absorption refrigeration and vapor compression refrigeration differ in the way the refrigerant is changed from a gas back into a liquid to repeat the cycle. A vapor compression refrigerator uses mechanical work, frequently supplied by an electrically-powered compressor, to increase the pressure and the temperature of the gas, and then condenses the hot, high pressure gas back to a liquid by heat exchange with a cool fluid, such as air or water, as in the case of chillers. An absorption refrigerator changes the pressure and temperature of the gas using a different method that needs only a low-power pump. The gas is first absorbed by an absorbing liquid and the liquid mixture is subsequently heated by an external heat source to generate a hot gas at an elevated pressure. The hot gas is then condensed back to a liquid when cooled. The absorption refrigeration provides a system that can be thermally driven by low grade heat which is generally too expensive to convert to electricity or shaft power to directly drive the compressors.

Conventional refrigeration systems, such as in trucks and trailers for example, use shaft power from an internal combustion engine or electricity from a generator driven by the internal combustion engine. In such applications, the thermal energy from the engine's exhaust and coolant is wasted. In other heating, ventilation, air conditioning, and refrigeration (HVAC&R) applications, solar energy has been used to power the refrigeration system. However, photo voltaic systems require additional components, such as power electronics and electricity storage to stabilize their voltage supply, resulting in high system cost. Also, solar thermal has been used to drive conventional absorption chillers. However, the current commercially available absorption chillers require the solar thermal collectors having high temperature lift, resulting in low collection efficiency. Therefore, a system using high efficiency solar thermal collectors, such as flat panel collectors or wasted heat for example, to achieve vapor compression may significantly improve the efficiency of the overall system. Furthermore, a substantially integrated system of an absorption vapor compression and a mechanical vapor compression can have the advantages of both processes.

BRIEF DESCRIPTION OF THE INVENTION

According to an aspect of the invention, a refrigeration system is provided including a vapor compression cycle having a condenser, and expansion valve, and evaporator and a compressor. A refrigerant is configured to circulate through the vapor compression cycle. The refrigeration system also includes an absorption refrigeration cycle having an absorber and a desorber arranged in a generally closed loop configuration. An absorption solution is configured to circulate through the absorption refrigeration cycle. The vapor compression cycle and the absorption refrigeration cycle are substantially integrated. The absorber is fluidly coupled to the compressor and is configured to generate a mixture of refrigerant and absorption solution. The desorber is fluidly coupled to the condenser and is configured to separate the refrigerant from the mixture as a vapor and increase the pressure of the refrigerant vapor.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
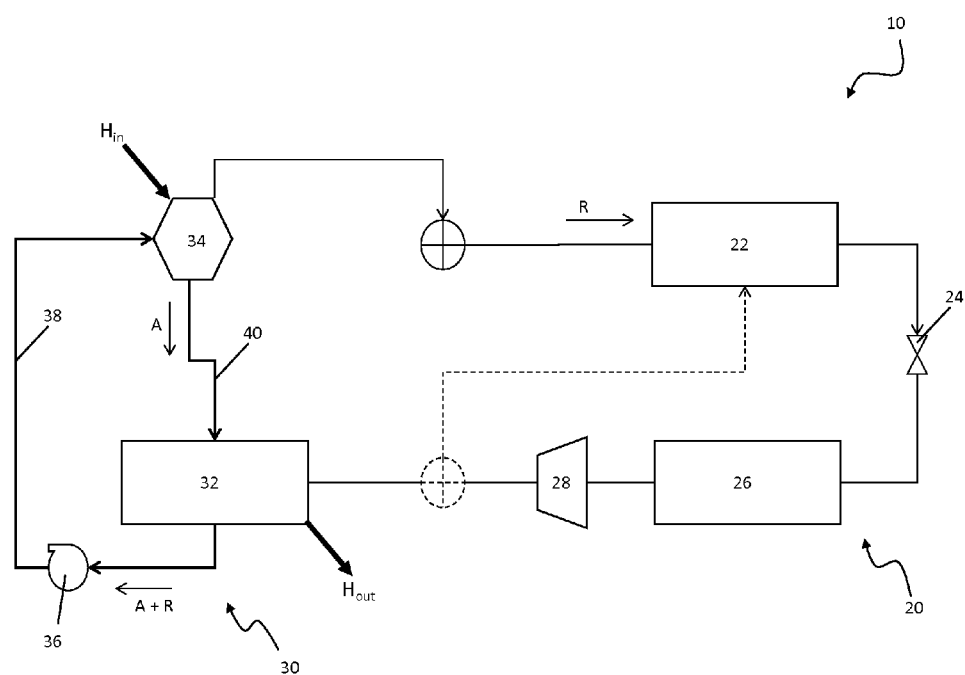
FIG. 1 is a schematic diagram of a refrigeration system according to an embodiment of the invention.

Referring now to the FIGS. a refrigeration system 10 that integrates both a vapor compression cycle 20 and an absorption refrigeration cycle 30 is illustrated. The vapor compression cycle 20 of the refrigeration system 10 generally includes a condenser 22, an expansion valve 24, an evaporator 26 and a compressor 28 through which a refrigerant R circulates. Exemplary refrigerants configured for use in the refrigeration system 10 include, but are not limited to, R134A, R410A, R404A, R1234zdE, and R1234zeE for example. The absorption refrigeration cycle 30 of the refrigeration system 10 generally includes an absorber 32 and a desorber 34 arranged in a substantially closed loop configuration such that an absorption solution A flows through. The absorption solution A selected for use in the refrigeration system 10 is dependent on the type of refrigerant used. Exemplary absorption solutions include, but are not limited to lubricants, polyol ester (POE), mineral oil, polyalkylene glycol (PAG) oil, and polyvinylether (PVE) for example. The absorption refrigeration cycle 30 is fluidly coupled to the vapor compression cycle 20 upstream from the condenser 22 and downstream from the compressor 28 such that the refrigerant R entering and exiting the absorption refrigeration cycle 30 have a substantially similar pressure.

The condenser 22 is a heat exchanger which allows heat energy to migrate from the hot vaporized refrigerant R to a first heat exchange medium, such as cool air or water for example. As a result, of the heat transfer relationship between the refrigerant R and the first heat exchange medium, the refrigerant R is cooled and condensed to a liquid. From the condenser 22, the saturated liquid refrigerant R flows to a throttle, or thermal expansion valve 24. The pressure drop of the refrigerant R within the thermal expansion valve 24 causes the temperature of the refrigerant R to drop before entering the evaporator 26. The evaporator 26 is also a heat exchanger configured to transfer heat energy between a second heat exchange medium, such as air or water for example, and the refrigerant R. The heat transfer between the warm second heat exchange medium and the refrigerant R causes the refrigerant R to evaporate. The vaporized refrigerant R is then provided to a compressor 28. The compressor 28 is configured to compress the vaporized refrigerant R such that the refrigerant R has an increased pressure, and therefore an increased temperature.

An absorber 32 of the absorption refrigeration cycle 30 is arranged generally downstream from the compressor 28. The absorber 32 is configured to receive a "strong" liquid absorbing solution A from the desorber 34, as well as the vapor of refrigerant R from the compressor 28 of the vapor compression cycle 20. As the refrigerant vapor and the liquid absorbing solution A mix within the absorber 32, the vaporized refrigerant R dissolves into the absorbing solution A such that a "weak" absorbing mixture A+R is provided at the outlet of the absorber 32. In one embodiment, the heat $H_{out}$ rejected by the vaporized refrigerant R in the absorber 32 may be used to heat a desired space. As illustrated, a pump 36, arranged along a conduit 38, may be configured to circulate the absorbing mixture A+R to the desorber 34. Heat $H_{in}$ provided by an external power source (not shown), such as solar power for example, is applied to the absorbing mixture A+R within the desorber 34. This added heat causes the refrigerant R to evaporate out and therefore separate from the "weak" absorbing mixture A+R to produce the "strong" absorbing solution A. The addition of heat $H_{in}$ also increases the pressure inside the desorber 34 to above the condensing pressure in condenser 22, where the vaporized refrigerant R is condensed back to liquid. The heated absorbing solution A returns to the absorber 32 through another conduit 40 to repeat the cycle.

Figure 2:
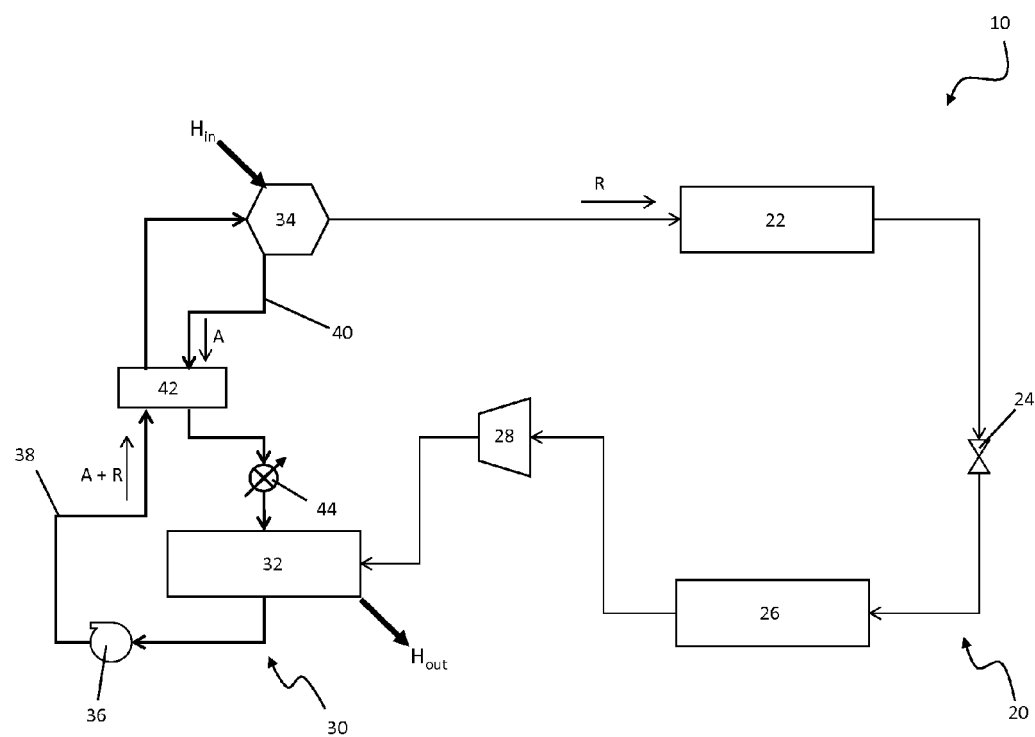
FIG. 2 is a schematic diagram of a refrigeration system according to another embodiment of the invention.

In another embodiment illustrated in FIG. 2, the absorption refrigeration cycle 30 of the refrigeration system 10 includes a heat exchanger 42 configured to arrange the mixture of absorbing solution A and refrigerant R within conduit 38 and also the heated absorbing solution A within conduit 40 in a heat transfer relationship. In the heat exchanger 42, heat transfers from the absorbing solution A in conduit 40 to the mixed absorbing solution A and refrigerant R such that the system 10 requires less external heat $H_{in}$ to separate and pressurize the refrigerant R from the absorbing solution A in the desorber 34. In one embodiment, an expansion valve 44 may be arranged within conduit 40 generally downstream from the first heat exchanger 42 and upstream from the absorber 32. The expansion valve 44 is configured to reduce the pressure of the absorbing solution A such that the refrigerant R more rapidly dissolves into the absorbing solution A within the absorber 32.

Figure 3:
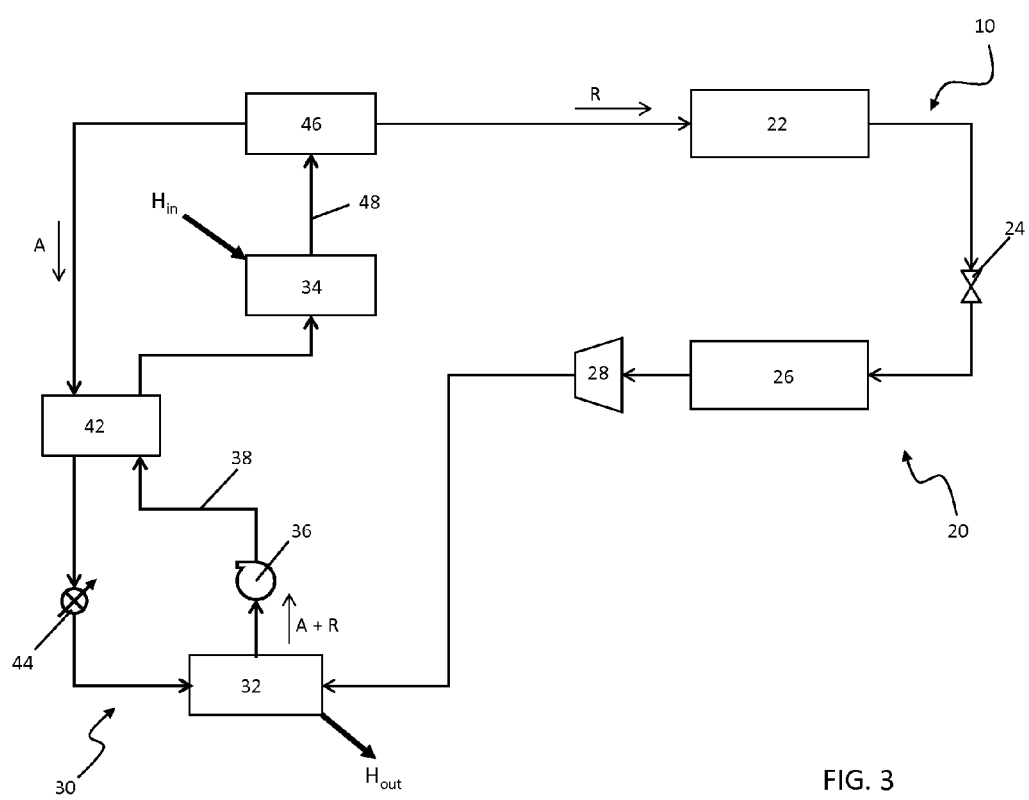
FIG. 3 is a schematic diagram of a refrigeration system according to another embodiment of the invention.
Figure 4:
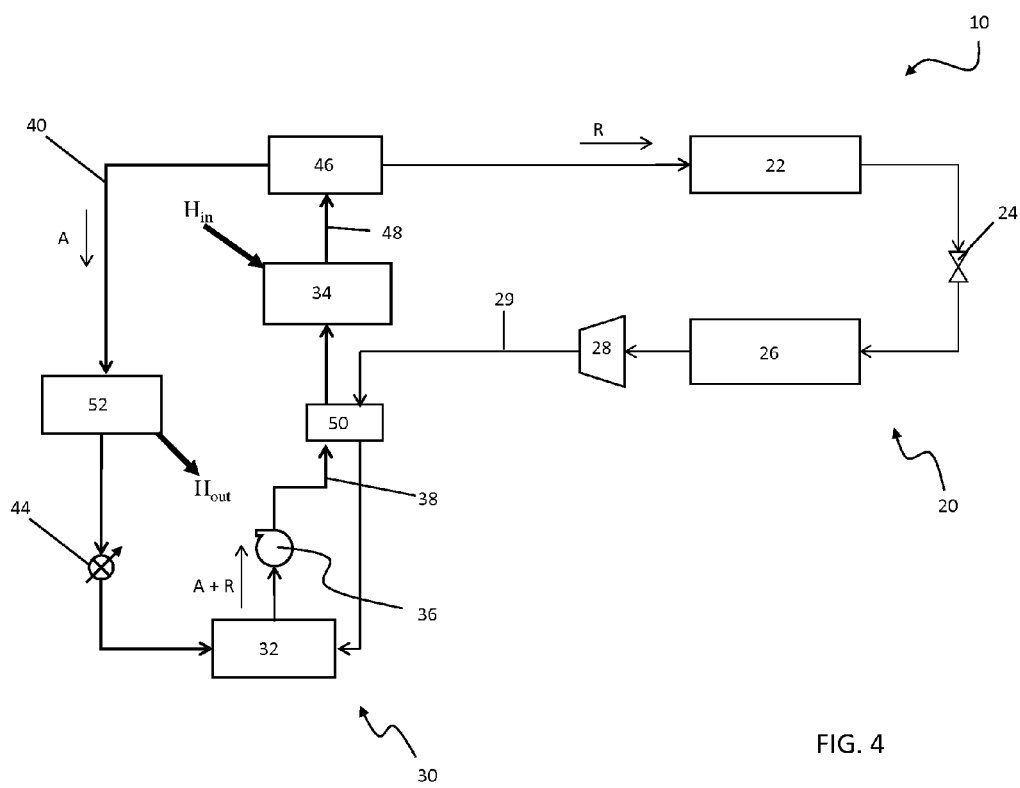
FIG. 4 is a schematic diagram of a refrigeration system according to another embodiment of the invention.
Figure 5:
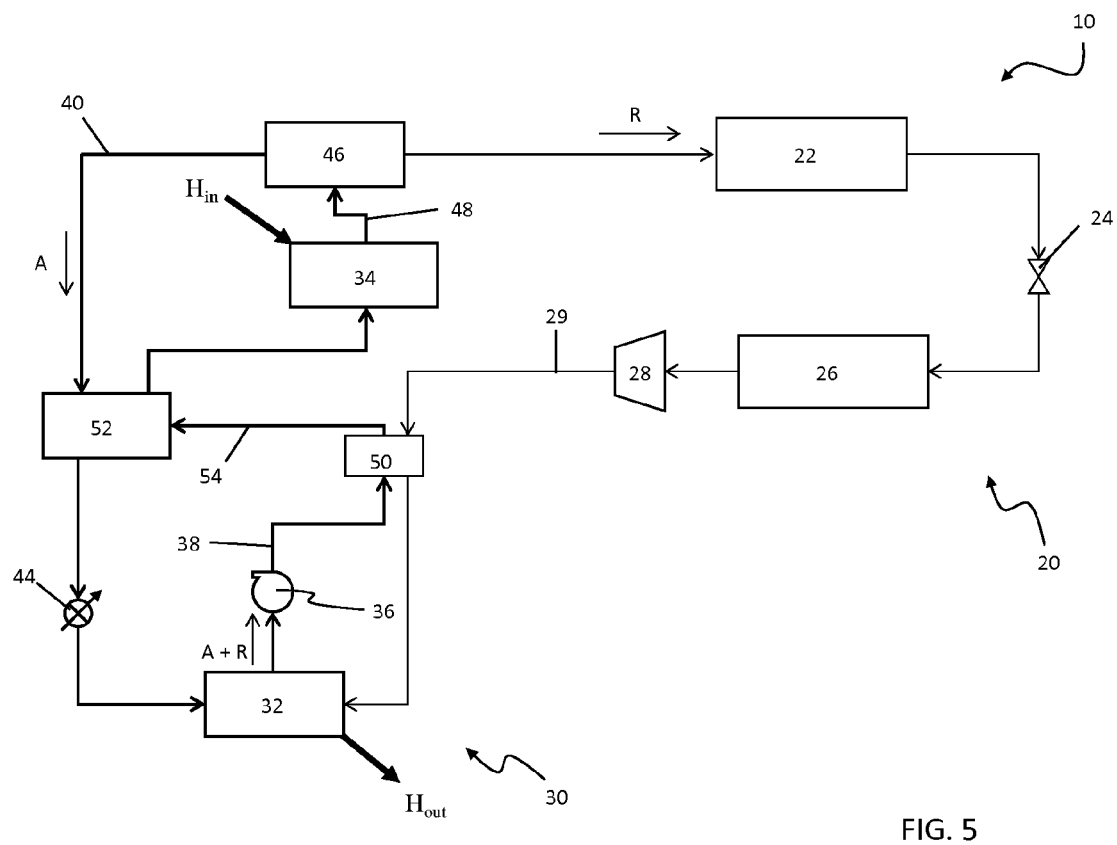
FIG. 5 is a schematic diagram of a refrigeration system according to another embodiment of the invention.

In one embodiment, illustrated in FIGS. 3-5, the desorber 34 is configured as a tube and shell heat exchanger such that the external heat $H_{in}$ is input into the desorber 34 using a liquid medium. In such embodiments, the system 10 may include a separator 46, distinct from the desorber 34. The mixture of heated absorbing solution A and vaporized refrigerant is provided to the separator 46 through another conduit 48, where the components of the mixture A+R are divided. The vaporized refrigerant R is supplied to the condenser 22 of the vapor compression cycle 20 for recirculation there through and the heated, liquid absorbing solution A is returned to the absorber through conduit 40.

Referring now to FIGS. 4 and 5, the absorber 32 of the refrigeration system 10 may be configured as a liquid-liquid mixer. In the illustrated non-limiting embodiment, the vaporized refrigerant R in conduit 29 connecting the compressor 28 and the absorber 32, and the mixture of absorbing solution A and refrigerant R being circulated to the desorber 34 by pump 36 are provided to a heat exchanger 50. Within the heat exchanger 50, heat is configured to migrate from the vaporized refrigerant R to the mixture of absorbing solution A and refrigerant R such that the refrigerant R supplied to the absorber 32 is in a substantially liquid state, not a vapor state. The heated mixture A+R is provided to the desorber 34, where external heat $H_{in}$ causes at least the refrigerant R therein to vaporize. The external heat $H_{in}$ may be provided from within the refrigeration system 10 such that the refrigeration system 10 is generally self-sustaining and does not require and additional heat source. In one embodiment, at least a portion of the external heat $H_{in}$ supplied to the desorber 34 includes heat discharged from the condenser 22. In another embodiment, at least a portion of the external heat $H_{in}$ includes the heat discharged by the absorber 32. The separator 46 arranged downstream form the desorber 34 removes the vaporized refrigerant R from the absorbing solution A. The refrigerant R is returned to the condenser 22 of the vapor compression cycle 20 for recirculation there through and the absorbing solution A is returned to the absorber through conduit 40.

In one embodiment, the conduit 40 extending between the separator 46 and the absorber 32 includes a heat exchanger 52 and an expansion valve 44. As illustrated in FIG. 4, the heat exchanger 52 is configured to transfer heat from the hot absorbing solution A to a cool heat exchange medium, such as air or water for example, such that the temperature of the absorbing solution A is controlled to sustain the absorption in absorber 32. In another embodiment, illustrated in FIG. 5, after passing through heat exchanger 50, the mixture of absorbing solution A and refrigerant R may be supplied to heat exchanger 52 as the cool heat exchange medium. The generally cool mixture of absorbing solution A and refrigerant R absorbs heat from the hot absorbing solution A. Because the mixture is partially heated when supplied to the desorber 34, a reduced amount of external heat $H_{in}$ is required to vaporize the refrigerant R.

Integration of a vapor compression cycle 20 and a refrigeration absorption cycle 30 into a refrigeration system 10 may significantly increase the fuel efficiency when applied to applications where thermal energy, such as from an internal combustion engine for example, is available. When the refrigeration system is applied to heating, ventilation, air conditioning, and refrigeration applications, a renewable energy source may be used to supply the external heat, resulting in a lower operating cost. As a result of the improved efficiency of the system, the size and capacity of critical components of the vapor compression cycle, such as the compressor for example, may be reduced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A refrigeration system comprising:
a vapor compression cycle including a condenser, an expansion valve, an evaporator, and a compressor having a refrigerant circulating there through; and
an absorption refrigeration cycle including an absorber and a desorber arranged in a generally closed-loop configuration such that an absorption solution circulates there through, wherein the absorber is configured as a liquid-liquid mixer wherein the vapor compression cycle and the absorption refrigeration cycle are integrated such that the absorber is fluidly coupled to the compressor and is configured to generate a mixture including refrigerant and absorbing solution and the desorber is fluidly coupled to the condenser, the desorber being configured to separate the refrigerant vapor from the mixture and increase a pressure of the refrigerant vapor, wherein a portion of the refrigerant output from the compressor is provided directly to the condenser and
wherein a first heat exchanger is arranged generally downstream from the compressor and generally upstream from the desorber, the first heat exchanger being configured to transfer heat between the refrigerant and the mixture such that the refrigerant supplied to the absorber condenses to a liquid.

2. The refrigeration system according to claim 1, wherein a heat exchanger is arranged generally downstream from the absorber and upstream from the desorber such, the heat exchanger being configured to transfer heat from the absorbing solution returning to the absorber to the mixture being supplied to the desorber.

3. The refrigeration system according to claim 1, wherein an expansion valve is arranged generally upstream from the absorber, the expansion valve being configured to reduce a pressure of the absorbing solution returning to the absorber from the desorber.

4. The refrigeration system according to claim 1, wherein the desorber is configured as a shell and tube heat exchanger.

5. The refrigeration system according to claim 4, wherein the refrigeration system further comprises a separator arranged downstream from the desorber and upstream from the condenser, the separator being configured to separate the refrigerant from the mixture.

6. The refrigeration system according to claim 1, wherein a second heat exchanger is arranged generally downstream from the desorber and generally upstream from the absorber, the second heat exchanger being configured such that heat transfers from the absorbing solution flowing there through to a cool heat exchange medium.

7. The refrigeration system according to claim 6, wherein the cool heat exchange medium is a cooling fluid.

8. The refrigeration system according to claim 6, wherein the cool heat exchange medium is mixture supplied from the first heat exchanger.

9. The refrigeration system according to claim 1, wherein the absorption refrigeration cycle includes a pump configured to circulate the absorption solution there through.

10. The refrigeration system according to claim 1, wherein heat from an external heat source is applied to the desorber to separate the refrigerant from the mixture and increase the pressure of the refrigerant vapor.

11. The refrigeration system according to claim 10, wherein the external heat source is an internal combustion engine.

12. The refrigeration system according to claim 10, wherein the external heat source is a solar panel.

13. The refrigeration system according to claim 1, wherein heat from a source within the refrigeration system is applied to the desorber to separate the refrigerant from the mixture and increase the pressure of the refrigerant vapor.

14. The refrigeration system according to claim 13, wherein at least a portion of the heat supplied to the desorber includes discharge heat from the condenser.

15. The refrigeration system according to claim 13, wherein at least a portion of the heat supplied to the desorber includes discharge heat from the absorber.

16. The refrigeration system according to claim 1, wherein heat rejected by the absorber is provided to a desired space.

* * * * *